(12) United States Patent
Linnenbrügger

(10) Patent No.: US 6,539,700 B2
(45) Date of Patent: Apr. 1, 2003

(54) CHAIN BELT FOR CONTINUOUSLY VARIABLE TRANSMISSION

(75) Inventor: André Linnenbrügger, Bühl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 140 days.

(21) Appl. No.: 09/811,955

(22) Filed: Mar. 19, 2001

(65) Prior Publication Data

US 2001/0023575 A1 Sep. 27, 2001

(30) Foreign Application Priority Data

Mar. 24, 2000 (DE) .......................... 100 14 891

(51) Int. Cl.[7] .............. F16H 9/24; F16G 1/24
(52) U.S. Cl. ................. 59/31; 59/8; 474/219; 474/228
(58) Field of Search ............. 59/31, 8; 474/214–217, 474/222, 221, 223, 228, 229

(56) References Cited

U.S. PATENT DOCUMENTS

| | | | | |
|---|---|---|---|---|
| 2,266,688 A | * | 12/1941 | Keller | ......................... 474/228 |
| 2,755,677 A | * | 7/1956 | Bremmer | ......................... 59/31 |
| 3,831,257 A | * | 8/1974 | Boggs et al. | ................... 59/31 |
| 4,710,154 A | * | 12/1987 | Rattunde | ..................... 474/219 |
| 4,863,418 A | * | 9/1989 | Fillar et al. | ................... 474/207 |
| 5,801,351 A | * | 9/1998 | Ecoffet et al. | .................. 59/31 |
| 6,299,559 B1 | * | 10/2001 | Friedmann | ................... 474/214 |

FOREIGN PATENT DOCUMENTS

| | | |
|---|---|---|
| DE | 35 26062 A1 | 1/1987 |
| DE | 3526062 C2 | 6/1987 |
| DE | 4415838 C1 | 8/1995 |

* cited by examiner

Primary Examiner—David Jones
(74) Attorney, Agent, or Firm—Darby & Darby

(57) ABSTRACT

In a chain belt (1) for a continuously variable cone-pulley transmission of a vehicle, lengthwise links (3a, 3b, 3c) are connected by transverse coupling members (2a, 2b) passing through openings (4) in the links. Retainer elements (7) at the ends of the coupling members serve to secure the links against falling off the coupling members or becoming misaligned. The retainer elements are attached to at least selected individual coupling members by resistance welding.

7 Claims, 3 Drawing Sheets

CHAIN BELT FOR CONTINUOUSLY VARIABLE TRANSMISSION

BACKGROUND OF THE INVENTION

The invention relates to a chain belt of the type used in continuously variable cone-pulley transmissions of vehicles, and it further relates to a method of manufacturing the chain belt as well as an apparatus for performing the method.

Chain belts of this type have links that are connected to each other by coupling members. Examples are known, e.g. from DE 35 26 062 and DE 44 15 838. The links in the chain belt are normally arrayed in transverse rows of multiple links, where each row of links is pivotally connected to the next by coupling members, typically in the form of transverse pins passing through openings in the links. To secure the links, i.e., to keep them from falling off the ends of the coupling members, the foregoing reference patents propose metallic retainer elements to be attached to the coupling members by laser welding.

According to DE 35 26 062, the metallic retainer elements are made by punching the pieces from sheet metal band material. They can also be made from rings of metal band that are subsequently cut open. The manufacture of the retainer elements from band material consumes a considerable amount of excess material beyond what is actually required for the retainer elements themselves. Due to the nature of the cutting process, a large portion of the material is wasted as scrap. Another disadvantage is that, due to the punching forces, the metal elements become warped and that the cutting process can cause undesirable chips and burs that are detrimental to the quality of the end product.

If the metal retainers are laser-welded to the coupling members, the manufacturing process requires a precise alignment of three elements in order to ensure a secure attachment of the retainer element. The coupling member has to be held in a fixed position, the retainer element has to be precisely located on the coupling member, and the laser beam has to be focused at the exact spot of the coupling member and/or the retainer element. The manufacturing process has to be designed with built-in assurance to keep these factors under control. This adds to the process time and thus reduces the throughput rate of the manufacturing process.

As a further observation, the one-sided exposure of the retainer element and/or coupling member to the laser beam causes a one-sided deformation of the retainer element, so that the retainer piece is attached in a distorted condition in the welding process. This reduces the holding strength of the attachment and the quality of the attachment of the retainer element in general.

OBJECT OF THE INVENTION

It is therefore the object of the present invention to provide a chain belt that belongs to the same type as described above but is based on an inherently less complicated design and can be more reliably controlled in the manufacturing process. In addition, the invention aims to provide a less complicated and less time-consuming manufacturing process. As a further object of the invention, a chain belt is to be provided with retainer elements that can be attached to the coupling members with a superior holding strength. An additional purpose is to reduce the amount of material consumed in manufacturing the chain belt.

SUMMARY OF THE INVENTION

According to the invention, the foregoing objective is met by a concept where retainer elements are attached at least to certain individual links and/or coupling members by a resistance-welded bond. In an advantageous embodiment of the invention, the method of resistance/compression welding is used for the attachment. The resistance welding method brings a reduction in the number of parameters that have to be adjusted in the control of the welding process, because the retainer element only has to be placed with a pre-selectable contact force against the part to which it is to be attached. The welding bond can be performed in a simple and reliably controllable operation, e.g., by generating a current flow through a capacitor discharge or other current-producing method.

According to a further concept, the object of the invention can also be attained if the retainer elements are attached at least to certain individual links and/or coupling members by friction welding.

Friction welding, likewise, offers a reduction in the number of parameters that have to be adjusted in the control of the welding process, because the retainer element only has to be pressed with a high contact force against the part to which it is to be attached, accompanied by a rotatory or oscillatory motion of the two parts in relation to each other. This causes the two parts to melt in the contact zone and thereby form the welded bond.

With the embodiments of the invention described above, it is particularly advantageous if the retainer element is a metal part. Particularly suitable is a metal ball. According to the invention, this has the advantage that the retainer elements can be fed to the fastening apparatus as finished individual pieces and, because of their spherical shape, without regard to orientation.

This eliminates the cutting process with its inherent waste of material due to the cut-away scrap portions, and it also eliminates the down time for putting a new roll of sheet metal band in place after the previous roll has been used up. By using retainer elements in the form of finished articles, the time that would otherwise be required for changing the roll can be used productively to increase the throughput rate of the manufacturing process.

There can also be cases where it is practical if the retainer element is a substantially square, cylindrical, hollow-cylindrical, hemispherical or crescent-shaped element, or a cone, a frustum, a segment of a sphere, a sphere with a hole, a ring, or a prismatoid. A retainer element in one of these shapes will be easy to attach to the coupling member or to another element that may be specified by the design of the chain.

The invention further relates to a method of manufacturing a chain belt. According to a first embodiment of the inventive method, the retainer element is positioned into contact with a coupling member with or without applying a force, and the bonding is performed by resistance welding.

According to a further concept within the scope of the present invention, the retainer element is positioned into contact with a coupling member with or without applying a force, and the bonding is performed by friction welding.

According to yet another concept within the scope of the invention, the retainer element is positioned into contact with a coupling member with or without applying a force, and the bonding is performed by ultrasonic welding. In the ultrasonic welding process, one of the parts to be connected is put into a state of ultrasonic vibration by means of a so-called sonotrode, so that the contact zone will melt and the welding bond will be formed.

The invention further relates to an apparatus for performing the method. The apparatus or fixture has a first holder element for holding a coupling member and a second holder element for holding a retainer element. At least one of the holder elements can be set at a variable position in relation to the other. The holder elements that are used to hold and position the elements that are to be welded together can be tongue-or tweezer-like grippers, vacuum-suction holders, holding devices working by means of vacuum or sub-atmospheric pressure, or holding devices working magnetically.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

In the following detailed description, examples of embodiments of the invention are discussed on the basis of the attached drawing in which.

DETAILED DESCRIPTION OF PREFERRED EMBODIMENTS

Figure 1:
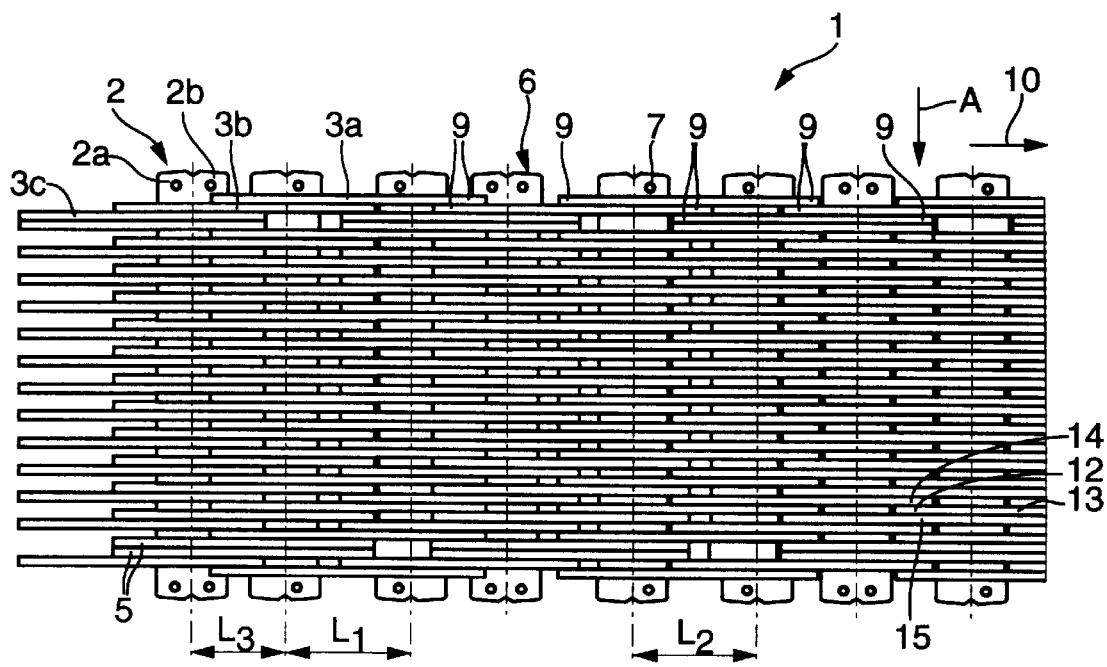
FIG. 1 represents a plan view of a chain belt.

FIG. 1 illustrates an endless flexible torque-transmitting device 1, in this case a chain belt for a belt transmission, and in particular for a continuously variable cone-pulley transmission for a motor vehicle. In the preferred arrangement, the transmission is part of a power train of a motor vehicle, operating between a source of motive power such as an engine and the driven axles of the vehicle to set the transmission ratio according to the operating conditions of the engine or in response to the commands of the driver.

The endless flexible torque-transmitting device 1 (otherwise referred to as chain belt 1, for short) in essence forms the connection between two pairs or sets of conical discs in the power-flow path or torque-flow path. The variable setting of the transmission ratio is accomplished by varying the running radii of the chain belt on the pulleys, using a control and/or regulating process to shift the axial positions of the pulleys as well as hold them at their set positions.

In essence, the chain belt 1 consists of links 3a, 3b, 3c and coupling members 2, the latter advantageously arranged in pairs 2a, 2b. The coupling members 2 or pairs of coupling members 2a, 2b are oriented transverse to the running direction (as indicated by arrow 10 in FIG. 1) of the chain belt 1. The chain belt 1 in essence runs in the direction given by the connecting path between the pairs of conical discs, which can coincide with the lengthwise direction of the chain belt 1.

The coupling members 2 or pairs of coupling members 2a, 2b reach through openings 4 of links 3a, 3b, 3c. The arrangement and the sequence of the links 3a, 3b, 3c are selected according to a periodic design where the same occupancy pattern of links repeats itself in every third transverse row along the chain belt, independent of the length or type of links used. Besides the illustrated design with a triadic periodicity, there are also advantageous embodiments where the pattern repeats itself in every second row.

The openings 4 can be configured so that each opening holds a pair of coupling members 2a, 2b, or they can be designed so that each opening is engaged by four coupling members, i.e., two pairs 2a, 2b. In the first version, where two coupling members traverse one opening 4, the links have in essence two openings, each of which accommodates a pair of coupling members 2a, 2b. In the second version, where four coupling members pass through a single opening, each link has in essence only one opening 4. In the latter case, the single big opening in the link can be the result of connecting two smaller openings. However, with either version, there can be additional perforations in the links, e.g., to reduce the weight or optimize the strength of the chain belt.

The end surfaces 6 of the coupling members 2, or pairs 2a, 2b, are operatively engaged, e.g., in frictional contact, with the working surfaces of the pairs of conical discs, transmitting a torque or force from one pair of conical discs to another by way of the chain belt 1. The end surfaces 6 transmit friction forces between the conical flanks of the disc pairs and the chain belt 1. The coupling members 2, or pairs of coupling members 2a, 2b, transfer or introduce a tensile force into the links 3a, 3b, 3c of the chain belt. The coupling members 2 or 2a, 2b have at least one end portion 6 secured by a retainer element 7 against slipping out of the links 3a, 3b, 3c. The function of transmitting a friction force between the chain belt and the conical discs can also be performed by additional force-transfer members, so that the coupling members only serve to transmit internal forces within the chain and the frictional engagement to the conical discs occurs through the additional force-transfer members.

The retainer elements 7 can be arranged either in an outward-facing area 8a or an inward-facing area 8b of the coupling members 2a, 2b, where the terms "outward-facing" and "inward-facing" are meant in relation to the closed loop of the chain belt.

Figure 2:
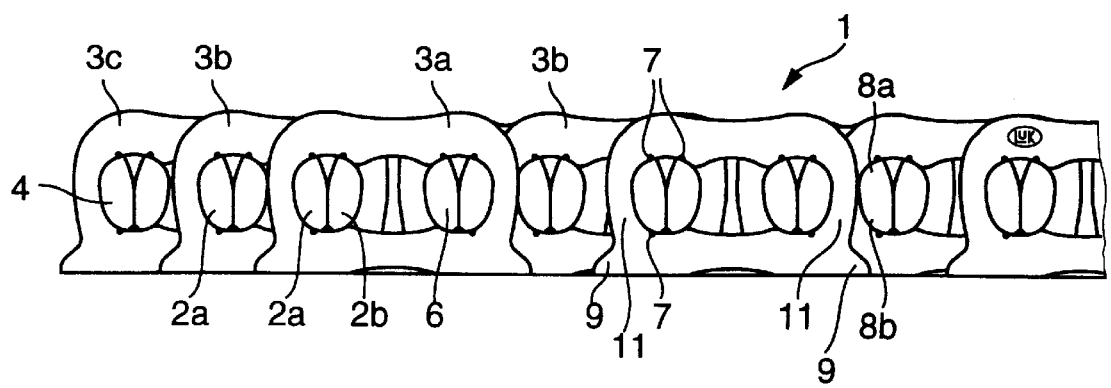
FIG. 2 represents a side view of a chain belt.

FIG. 2 gives a side view of a chain belt as seen in the direction indicated by the arrow A in FIG. 1. The links 3a, 3b, 3c alternate in periodic groups of three. It is possible, but not illustrated in the drawing, to use links of different lengths or types. The links have openings 4 traversed by coupling members 2a, 2b. At least portions of the circumference of the coupling members are in operative contact with parts of the border contours of the openings to transmit forces, specifically tensile forces. The links are secured by retainer elements 7 on the coupling members so that the outermost links cannot fall off the coupling member and/or become dislodged into a skewed position. The links, and in this specific case all of the links, have protuberances 9 attached to or formed on the end portions 11 of the links, looking in the running direction 10. The protuberances 9 are there preferably for the purpose that the neighboring links 3a, 3b or 3b, 3c, and/or 3c, 3a will touch each other at least through the surface areas of the protuberances, so that the protuberances or end portions of these links fill the spaces between the next following links along the chain. Thus, the links are supporting each other in the transverse direction of the chain belt.

The links 13, 14, 15 in FIG. 1 will serve to explain this more clearly. The protuberance 12 of link 13 serves as a space holder between the links 14 and 15, where one side of the protuberance 12 lies against the link 15 and the other side of the protuberance 12 lies against the protuberance of the link 14. Thus, the links 13, 14, 15 are keeping each other in position relative to the transverse direction of the chain.

It is especially advantageous if all of the links have the two protuberances 9, because this reduces the variety of different parts. If the links used in the design of a chain belt are divided into n different link lengths, then the assortment of links to make up the chain will only consist of n different types of links.

The chain belt 1 illustrated in FIGS. 1 and 2 is designed with links of different lengths $L_1$, $L_2$, $L_3$. The sequence in which the different lengths follow each other along the chain belt is based on a random selection, preferably according to purely stochastic probability and avoiding any repetitions of the same sequential order of link lengths.

Figure 3:
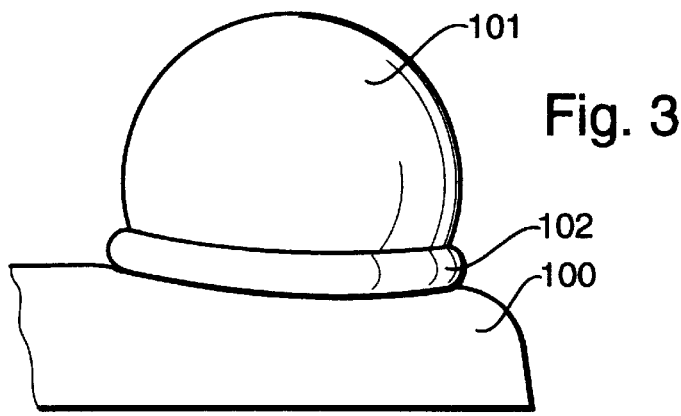
FIG. 3 represents an installed retainer element.
Figure 4:
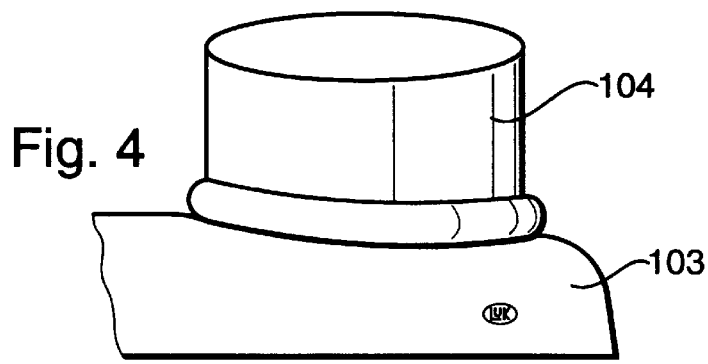
FIG. 4 represents an installed retainer element.
Figure 5:
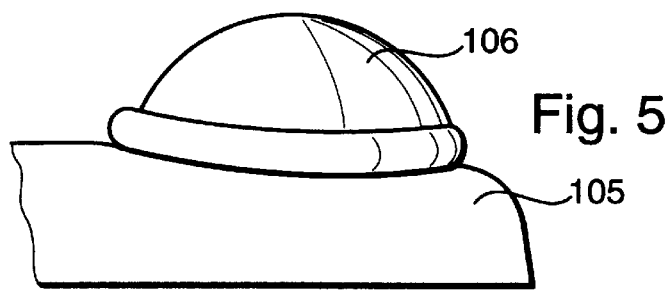
FIG. 5 represents an installed retainer element.
Figure 6:
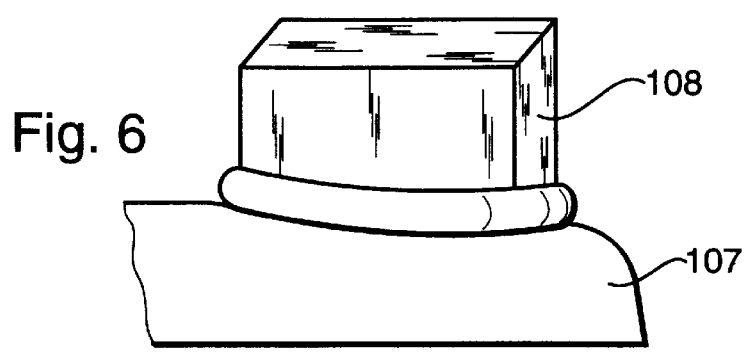
FIG. 6 represents an installed retainer element.

FIGS. 3 and 6 illustrate embodiments of retainer elements in their attached condition on a coupling member. The reference numbers 100, 103, 105, and 107 designate a portion of the coupling member in each of the respective FIGS. 3 to 6. The retainer element 101 is an originally spherical metal ball shown here after welding. The bead 102 consists of the material that was melted and displaced in the welding process. Element 104 is a cylindrical metallic element welded onto the coupling member portion 103. Element 106 is a hemispherical metallic element welded onto the coupling member portion 105, and element 108 is shaped as a square metallic block welded onto the coupling member portion 107.

Figure 7:
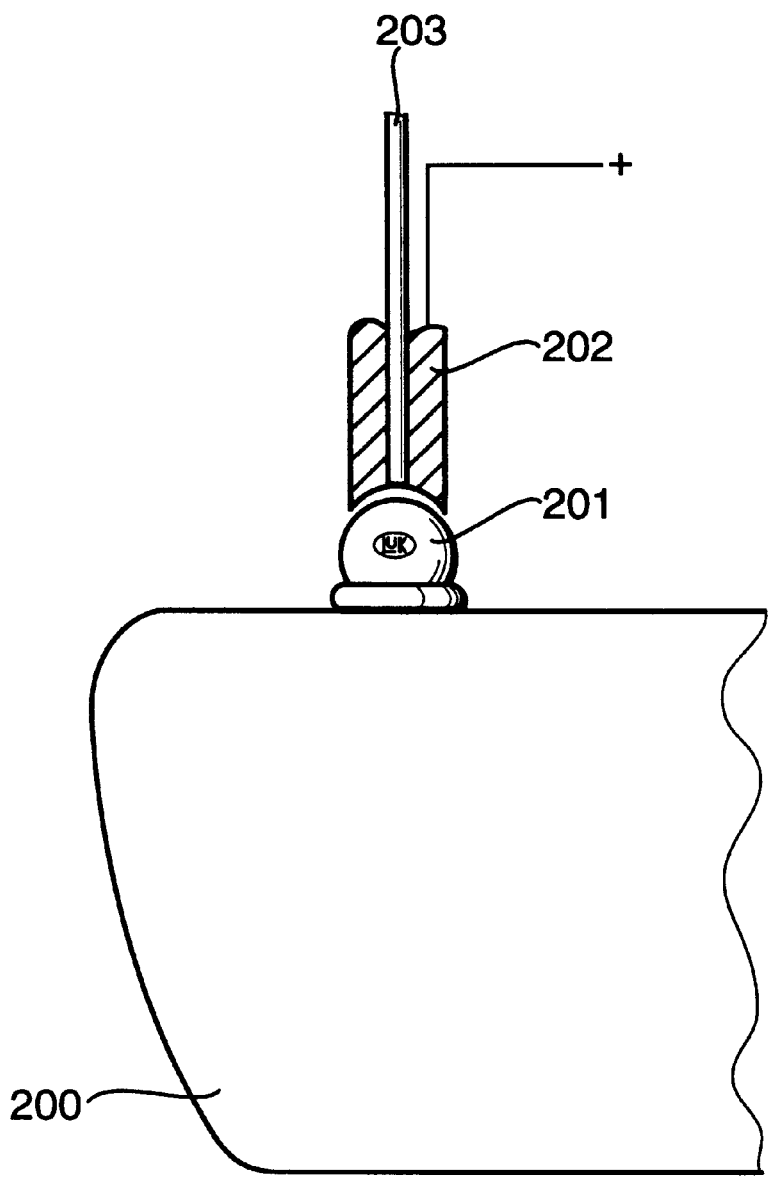
FIG. 7 represents an end portion of a coupling member with a retainer element.

FIG. 7 illustrates a process and apparatus according to the invention for attaching a retainer element to a coupling member 200, e.g., by welding. The retainer element 201, such as a spherical ball, is set in position on the coupling member by means of the holder element 202. To perform its function, the holder element may for example be connected to a suction-generating vacuum line 203 or it may be equipped with another suitable device for holding the retainer element 201.

In the illustrated embodiment of FIG. 7, both the holder element 202 and the holder element for the coupling member are connected to an electric circuit, e.g., a capacitor discharge circuit, that delivers a welding current.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A chain belt for a continuously variable cone-pulley transmission of a vehicle, the chain belt comprising links, coupling members connecting the links to each other, and retainer elements attached to at least selected individual coupling members by one of a resistance-welded bond and a friction-welded bond, wherein the retainer elements are substantially spherical balls prior to being attached by said welded bond.

2. The chain belt of claim 1, wherein the retainer element is made of metal and, prior to being attached to a coupling member, exists in the form of an individual, separate item.

3. A method of manufacturing a chain belt for a continuously variable cone-pulley transmission of a vehicle, said chain belt comprising links, coupling members connecting the links to each other, and retainer elements attached to at least selected individual coupling members by one of a resistance-welded bond and a friction-welded bond, said retainer elements being substantially spherical balls prior to being attached by said welded bond, the method comprising the steps of:

a) positioning one of the retainer elements on one of the coupling members;

b) welding said one of the retainer elements to said one of the coupling members.

4. The method of claim 3, wherein at least during step b) a force is applied to press the retainer element against the coupling member.

5. The method of claim 3, wherein the welding in step b) comprises resistance welding.

6. The method of claim 3, wherein the welding in step b) comprises friction welding.

7. Apparatus for performing a method of manufacturing a chain belt for a continuously variable cone-pulley transmission of a vehicle, said chain belt comprising links, coupling members connecting the links to each other, and retainer elements attached to at least selected individual coupling members by one of a resistance-welded bond and a friction-welded bond, said retainer elements being substantially spherical balls prior to being attached by said welded bond, the method comprising the steps of:

a) positioning one of the retainer elements on one of the coupling members;

b) welding said one of the retainer elements to said one of the coupling members; said apparatus comprising a first holder element for holding said one of the coupling members and a second holder element for holding said one of the retainer elements, wherein at least one of the holder elements is movable in relation to the other in order to perform step a) of the method.

* * * * *